(12) United States Patent
Amirparviz

(10) Patent No.: US 7,758,187 B2
(45) Date of Patent: Jul. 20, 2010

(54) CONTACT LENS FOR THREE DIMENSIONAL VISUALIZATION

(75) Inventor: Babak Amirparviz, Seattle, WA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 12/365,819

(22) Filed: Feb. 4, 2009

(65) Prior Publication Data

US 2009/0213459 A1 Aug. 27, 2009

Related U.S. Application Data

(60) Provisional application No. 61/026,069, filed on Feb. 4, 2008.

(51) Int. Cl.
G02C 7/04 (2006.01)
G02B 27/22 (2006.01)

(52) U.S. Cl. ..................... 351/162; 359/464

(58) Field of Classification Search ............ 351/160 R, 351/160 H, 161, 162; 359/464
See application file for complete search history.

(56) References Cited

U.S. PATENT DOCUMENTS

| | | | |
|---|---|---|---|
| 3,975,474 A | 8/1976 | Leblanc | |
| 4,573,774 A | 3/1986 | Sitterle | |
| 4,874,234 A | 10/1989 | Wichterle | |
| 5,243,460 A * | 9/1993 | Kornberg | 359/464 |
| 5,500,695 A | 3/1996 | Newman | |
| 5,650,837 A | 7/1997 | Roffman | |
| 6,002,518 A * | 12/1999 | Faris | 359/465 |
| 6,113,236 A | 9/2000 | Chapman | |
| 6,176,578 B1 | 1/2001 | Clutterbuck | |
| 6,874,888 B1 * | 4/2005 | Dudai | 351/162 |
| 7,134,753 B2 | 11/2006 | Back | |
| 7,152,975 B2 | 12/2006 | Ho | |
| 7,164,529 B2 | 1/2007 | Sekizawa | |
| 7,296,891 B2 | 11/2007 | Streibig | |
| 2005/0128433 A1 | 6/2005 | Jahnke | |

* cited by examiner

Primary Examiner—Scott J Sugarman
(74) Attorney, Agent, or Firm—Christensen O'Connor Johnson Kindness PLLC

(57) ABSTRACT

A contact lens set for stereoscopic visualization includes a left contact lens comprising a first lens substrate incorporating a first polarizer, and a right contact lens comprising a lens substrate incorporating a second polarizer. The first polarizer comprises a first plurality of parallel lines having sub-wavelength pitch and oriented in a first direction. The second polarizer comprises a second plurality of parallel lines having sub-wavelength pitch and oriented in a second direction. The left contact lens and the right contact lens each comprises a rotational stabilization means, such that, during use, the first direction is adapted to orient in an approximately orthogonal direction to the second direction. In another embodiment, a contact lens set for stereoscopic visualization includes a left contact lens and a right contact lens, each coded with different colors.

13 Claims, 4 Drawing Sheets

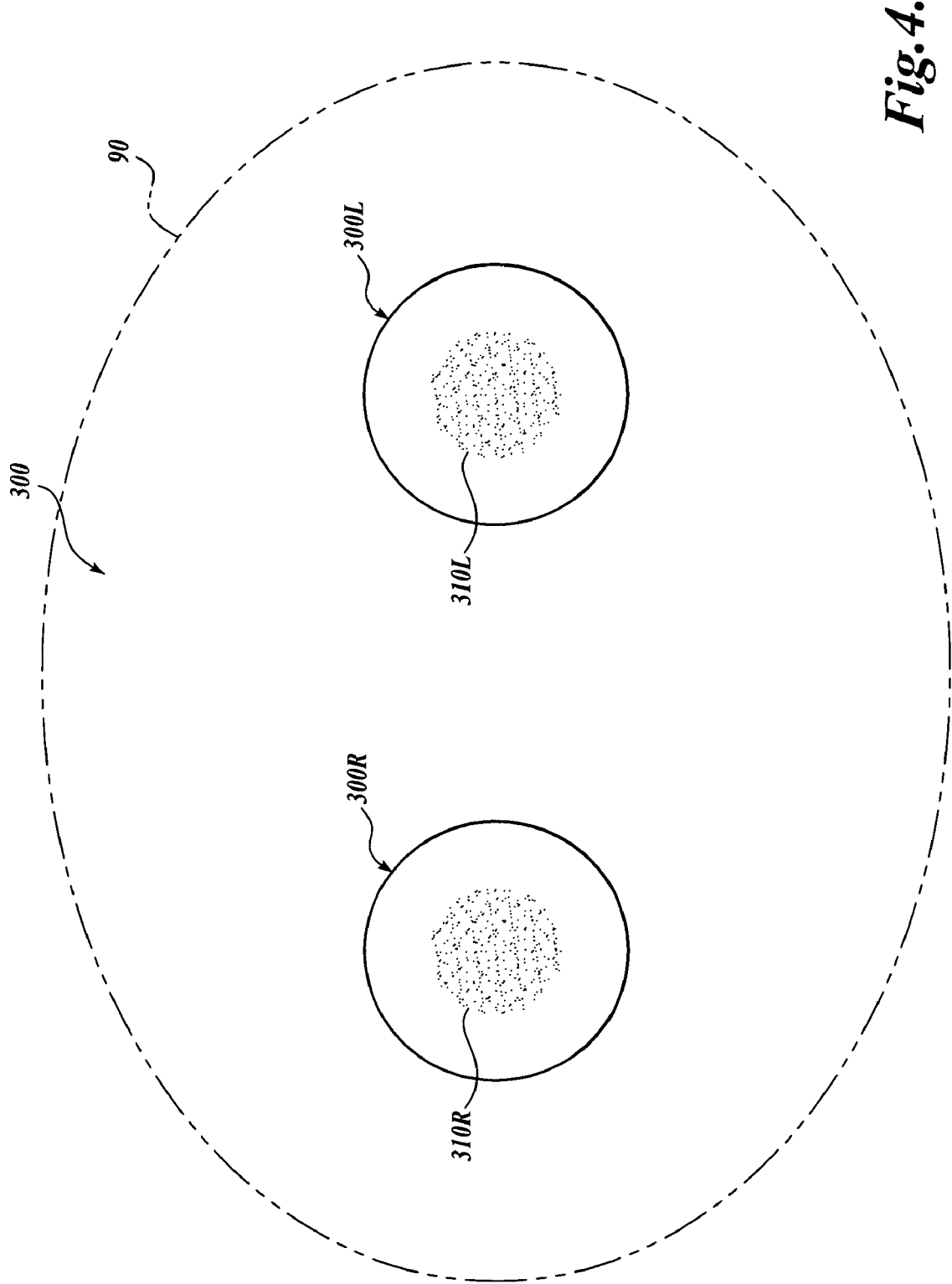

CONTACT LENS FOR THREE DIMENSIONAL VISUALIZATION

CROSS-REFERENCE TO RELATED APPLICATION

This application claims the benefit of Provisional Application No. 61/026,069, filed Feb. 4, 2008, the disclosure of which is incorporated herein by reference in its entirety.

BACKGROUND

This invention is in the field of eyewear, and more particularly in the field of eyewear for stereoscopic or three-dimensional visualization.

Because the eyes of humans are in different positions on the head, they perceive slightly different views. This is the basis of stereopsis, the process by which the brain exploits the parallax due to the different views from the eye to gain different perception and estimate the distance to objects. Based on the same principle, parallax has been exploited in the engineering of devices for stereoscopic visualization.

A common method for producing stereoscopic images for a viewer is to project two sets of images, wherein the projected images are filtered such that one set of images is linearly polarized in a first direction, and the second set of images is linearly polarized in a direction perpendicular to the first direction. The two sets of images are stereoscopic, i.e., imaging the same view from slightly different positions. The images are viewed by a viewer through a pair of spectacles having polarizer (or polarized) lenses, wherein the polarization direction of the lenses are offset by about ninety degrees. The polarization directions of the projected images are similarly oriented, so that each lens is substantially transparent to one set of images, and is substantially opaque to the other set. The user's left eye, therefore, sees the first set of images, and the right eyes sees the second set of images. Using parallax, the viewer is able to perceive a stereoscopic image assembled from the left eye image and the right eye image, providing an illusion of three-dimensionality. Examples of stereoscopic imaging apparatus taking advantage of polarization are disclosed, for example, in U.S. Pat. No. 3,975,474, and in U.S. Pat. No. 7,164,529, both of which are incorporated by reference in their entirety.

However, current stereoscopic viewing technology usually requires the use of bulky devices such as 3D viewing glasses, which are often inconvenient for a viewer to carry around and keep track of. In addition, the current external stereoscopic viewing devices, such as glasses, limit the mobility of the viewer and, therefore, do not allow a complete experience in a virtual world. The present invention seeks to overcome the disadvantages of current stereoscopic visualization devices and provides further related advantages.

SUMMARY OF THE INVENTION

This invention provides contact lenses for stereoscopic visualization. In one embodiment, the invention provides a contact lens set for stereoscopic visualization using light polarization. The contact lens set includes a left contact lens and a right contact lens. The left contact lens comprises a lens substrate incorporating a first polarizer, wherein the first polarizer comprises a first plurality of parallel lines having sub-wavelength pitch and oriented in a first direction. The right contact lens comprises a lens substrate incorporating a second polarizer, wherein the second polarizer comprises a second plurality of parallel lines having sub-wavelength pitch and oriented in a second direction. The left contact lens and the right contact lens each comprises a rotational stabilization means such that, during use, the first direction is adapted to orient in an approximately orthogonal direction to the second direction.

The rotational stabilization means may include a center of gravity displaced in a direction toward the edge of the contact lens. The center of gravity of the lens may be displaced by additional weight on one side of the contact lens, which may be accomplished by thinning one side of the contact lens with respect to the other, or adding extra lens substrate volume to one side of the contact lens. The rotational stabilization means may also include at lease one identifiable marking on a surface of the contact lens, indicating the orientation of the lens in reference to the polarization direction of the lens.

In another embodiment, the present invention provides a contact lens set for stereoscopic visualization using color-coded image construction. The contact lens set includes a left contact lens and a right contact lens. The left contact lens comprises a lens substrate, wherein at least a center portion of the left contact lens is made to selectively filter or pass a first wavelength. The right contact lens comprises a lens substrate, wherein at least a center portion of the right contact lens is made to selectively filter or pass a second wavelength.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawing, wherein:

FIG. 4 is a schematic illustration of an alternative embodiment of the contact lens set for stereoscopic visualization using color-coded image construction.

DETAILED DESCRIPTION

Two representative embodiments of the present invention are described with reference to FIGS. 1-4.

Figure 1:
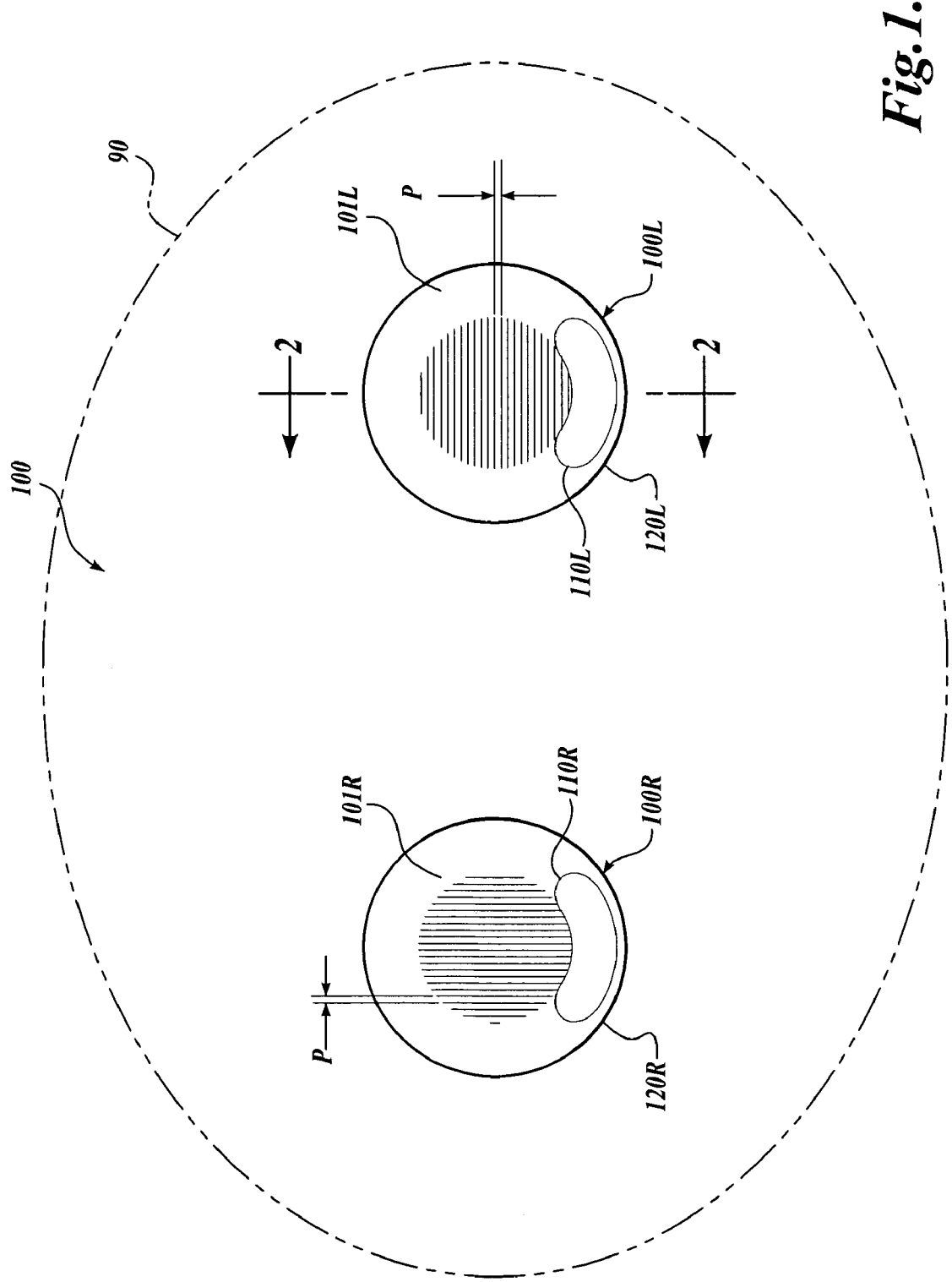
FIG. 1 is a schematic illustration of one embodiment of the contact lens set for stereoscopic visualization using light polarization.

FIG. 1 shows schematically a contact lens set 100 on a viewer 90 (in phantom). The contact lens set 100 comprises a left contact lens 100L and a right contact lens 100R, each equipped with a linear polarizer portion, as discussed below. The polarization direction of the left contact lens 100L is approximately orthogonal to that of the right contact lens 100R. Each linear polarizer comprises a set of parallel metal lines or wires 101L, 101R produced on the surface of the lens 100L, 100R or embedded in the lens substrate. The parallel lines or wires 101L and 101R have sub-wavelength pitch P. As used herein, "sub-wavelength pitch" means that the distance between neighboring lines or wires of the polarizer is generally less than the smallest wavelength of the received light that is of interest to the user. Preferably, the pitch is less than about one-fifth of the smallest wavelength of light of interest. Therefore, for applications in the visible light spectrum preferably the pitch is equal to or less than about 60 nm.

As known in the field of microelectronic fabrication parts, the polarizer having parallel metal lines or wires 101L, 101R can be created through a variety of techniques including, but not limited to, e-beam lithography and nano-imprint lithography.

The capability of parallel metal lines or wires 101R, 101L to linearly polarize light has been reported previously in the literature. For example, the commonly used wire-grid polarizer consists of a regular array of fine parallel metallic wires. The incoming light wave with an electric field aligned parallel to the wires induces the movement of electrons along the length of the wires, such that the light wave's energy is absorbed or reflected. For an incoming light wave oriented with its electric field perpendicular to the wires little energy is lost or reflected, and the light wave is able to travel through the metallic grid. A light wave oriented with its electric field parallel to the wire is absorbed or reflected. To function, the pitch must be less than the wavelength of the incoming light wave and is typically measured as the distance between the centerline of adjacent lines. The wire width is generally a small fraction of the pitch.

Figure 2:
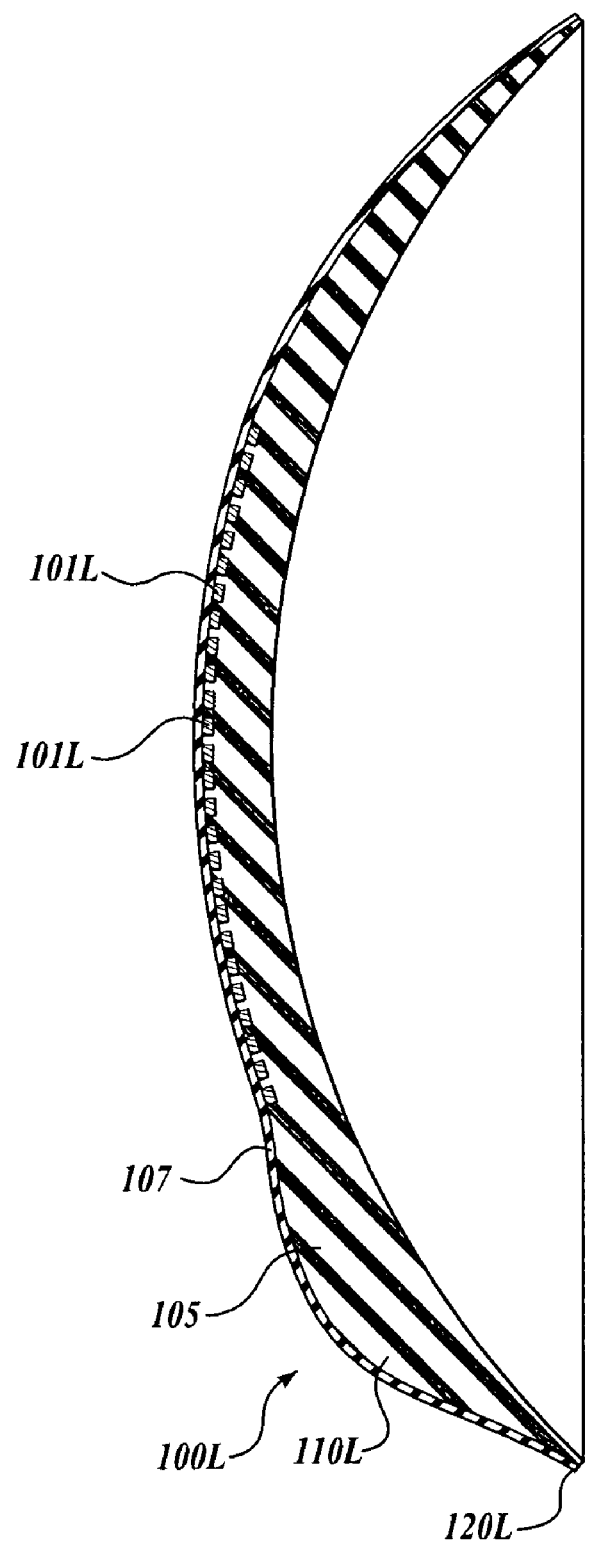
FIG. 2 is a diagrammatic cross section of the contact lens set of FIG. 1 along the line 2-2, showing the displaced center of gravity of the lens.

Refer now also to FIG. 2, which illustrates a cross-section of the left lens 100L. In this embodiment, the lens substrate 105 is formed from a biocompatible polymer. In one embodiment, the lens substrate 105 comprises polymethylmethacrylate (PMMA). Other suitable biocompatible polymers include, without limitation, poly(2-hydroxyethyl methacrylate), poly(glycerol methacrylate), poly(methyl methacrylate), polyethylene oxide, polyvinyl alcohol, polydioxaline, poly(acrylic acid), poly(acrylamide), and poly(N-vinyl pyrrolidone).

In a current method, the metal lines 101R, 101L are fabricated on the lens substrate 105 and the metal lines are encapsulated by a capping polymer layer 107 prior to cutting and micro-molding the lens shape. Any capping polymer useful in manufacturing contact lenses would be useful in the present invention. For example, in one embodiment, a polyxylene polymer, such as parylene, is used for the capping polymer layer 107.

After the metal lines are fabricated and encapsulated on the lens substrate, the resulting panel is cut into a desired shape, for example, to produce a generally circular contact lens. The cut portion is then micro-molded into the desired three-dimensional lens shape. A final polishing step will prepare the contact lens set 100 for use by the viewer 90.

Still referring to FIG. 1, when the contact lens set 100 is in use, the functionality of the contact lens set 100 for observing stereoscopic images is dependent upon the relative orientation of the polarization direction of the left lens 100L with regard to that of the right lens 100R. Preferably, when the lenses 100L, 100R are each in contact with the surface of the cornea (not shown), the direction of the parallel metal lines 101L should be approximately orthogonal to the direction of the parallel metal lines 101R. Rotational stabilization means constructed within each lens 100L, 100R serves to keep the contact lenses in a desired relative orientation during use.

Various rotational stabilization techniques are known in connection with toric contact lenses for correcting astigmatism. These rotational stabilization techniques are equally applicable to the contact lenses of the present invention. In general, rotational stabilization techniques fall into two basic categories: prism stabilization, and dynamic stabilization.

Prism stabilization involves constructing a contact lens preferentially weighted on one side, such that the center of gravity of the lens is displaced in the direction toward the edge of the contact lens. Prism stabilization is currently the most used technique for rotational stabilization of contact lenses. For example, U.S. Pat. No. 4,874,234 discloses a contact lens with a displaced center of gravity; U.S. Pat. No. 7,134,753 discloses a rotational stabilization means, such as prism ballast, and a thickness profile in a contact lens that reduces the torque imparted on the lens by the action of the eyelids, which helps to stabilize the lens; U.S. Pat. No. 6,113,236 discloses a contact lens having a posterior surface and an anterior surface, the surfaces being shaped to form a ballast to provide the desired rotational stabilization to the lens; and U.S. Pat. No. 4,573,774 discloses a contact lens utilizing a prism ballast as a means of maintaining correct axial orientation. All above references are incorporated by reference in their entirety.

Referring back to FIG. 1, the center of gravity of the lens may be displaced by adding extra lens substrate volume to one side of the contact lens 100R, 100L, resulting in a thickened area 110R, 110L. As shown in FIG. 2, the thickened area 110R, 110L may have a shape of a hanging drop and may not reach as far as to the lower edge 120R, 120L of the lens. The additional volume of the lens substrate may be added during the microfabrication process. Alternatively, the center of gravity may be displaced by thinning one side of the contact lens with respect to the other side. The thinning process may be carried out during the polishing process.

Still referring to FIG. 1, for the contact lens set 100 to function properly, the center of gravity of each lens 100R, 100L must be displaced in a controlled fashion such that, during use, the polarization direction of the left lens 100L stays approximately orthogonal to the polarization direction of the right lens 100R. To accomplish that, the thickened area 110R is placed perpendicular to the parallel metal lines 101R; and the thickened area 110L is placed parallel to the parallel metal lines 101L. During use, the displaced center of gravity of each lens 100R, 100L naturally rotates to the bottom position, keeping the parallel metal lines 101R in a vertical position and the parallel metal lines 101L in a horizontal position. This leads to the orthogonal orientation between the polarization directions of the lenses.

Figure 3:
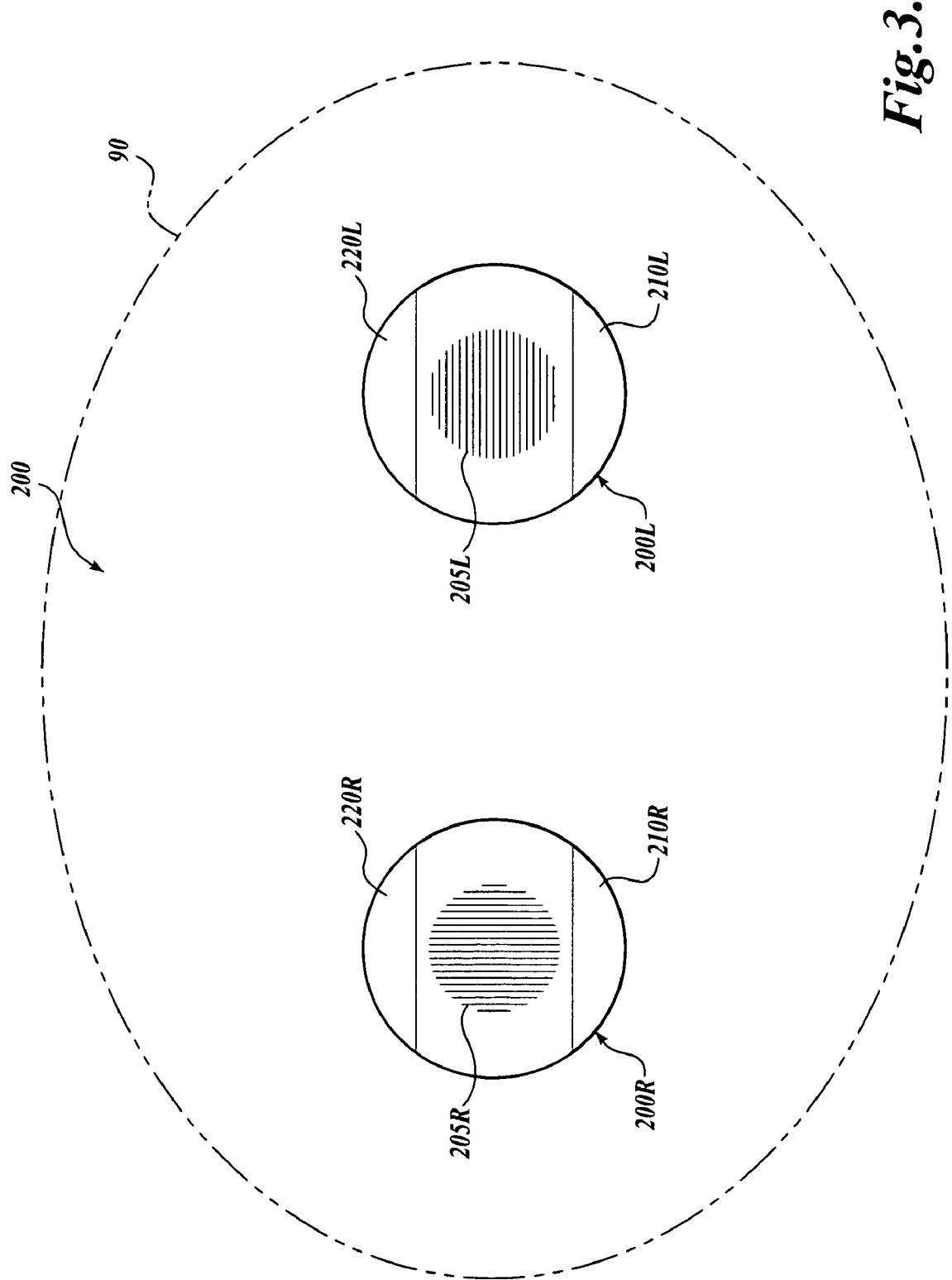
FIG. 3 is a schematic illustration of a representative contact lens set using an inferior and a superior thin zone on each lens as rotational stabilization means.

Dynamic stabilization, by contrast, relies on interaction between the eyelids and the lens to achieve the desired alignment of the lens. For example, the rotational stabilization may be achieved by designing a contact lens with an inferior and a superior thin zone outside the optical zone (i.e., the area overlying the user's iris). FIG. 3 shows another embodiment of a contact lens set 200 including a left lens 200L and a right lens 200R, each having an inferior thin zone 210L, 210R and a superior thin zone 220L, 220R outside of the optical zone 205L, 205R. The lens may have symmetrical or asymmetrical thin zones. The thin zones serve as rotational stabilization means and are placed in such a way that, during use, the polarization direction of the left lens 200L stays at an approximately orthogonal direction to that of the right lens 200R.

Various dynamic stabilization techniques for use on contact lenses have been developed. For example, U.S. Pat. No. 5,650,837 discloses a non-ballasted, rotationally stabilized contact lens, in which the lens is positionally and rotationally stabilized in the eye through the interaction between the lens and the eyelid; U.S. Pat. No. 5,500,695 discloses a contact lens using waveform contours on the lens periphery to enable proper location and orientation of the lens by interaction between the lens, the eye, and the eyelid. See also, U.S. Pat. Nos. 6,176,578; and 7,152,975. All these references are incorporated by reference in their entirety.

It is contemplated that, in order to facilitate the proper placement of the contact lens inside an eye, the lens may further include at least one identifiable marking on the surface of the contact lens, indicating the orientation of the lens in reference to the polarization direction of the lens. The marking may be tiny, almost invisible markings, such as dots, lines, or dents on the lens, preferably located at the edge of the lens. These markings may be formed by known techniques. When placing the lens on the cornea of an eye, the marking provides guidance on the proper orientation of the lens.

In another embodiment, the present invention provides a contact lens set for stereoscopic visualization using color-coded image construction. In this embodiment, each contact lens filters for a specific wavelength. The projected images for the contact lens set have two separate image components programmed according to the wavelength of each lens. Therefore, each lens only allows the image component having the corresponding wavelength to go through, letting the viewer perceive two different images simultaneously.

Various known methods may be used to selectively filter a desired wavelength through a contact lens including, for example, the incorporation of dyes or multilayer dielectric filters. The prior art discloses various methods for making color contact lenses including, for example, U.S. Pat. Nos. 7,296,891, and U.S. Patent Publication No. 2005/0128433, both of which are hereby incorporated by reference in their entirety.

FIG. 4 shows a representative contact lens set 300 using color-coded image construction on a viewer 90 (in phantom). Referring to FIG. 4, the contact lens set 300 includes a color-coded left lens 300L and a color-coded right lens 300R. The center portion 310L, 310R of each lens that overlies the iris is colored. The center portion 310L is colored with a different color than the center portion 310R. For example, the center portion 310L may be colored a first color such as red, and the center portion 310R may be colored a second color, such as blue. An image generated in the first color is filtered through the left lens 300L to reach the left eye, and an image generated in the second color is filtered through the right lens 300R to reach the right eye. By assembling the left eye image and the right eye image, the viewer will see a stereoscopic image.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A contact lens set for stereoscopic visualization, comprising:
   a left contact lens comprising a lens substrate incorporating a first polarizer, wherein the first polarizer comprises a first plurality of parallel metal lines having a pitch not greater than 60 nm, wherein the first plurality of parallel metal lines are oriented in a first direction; and
   a right contact lens comprising a lens substrate incorporating a second polarizer, wherein the second polarizer comprises a second plurality of parallel metal lines having a pitch not greater than 60 nm, wherein the second plurality of parallel metal lines are oriented in a second direction;
   wherein the left contact lens and the right contact lens each comprises a rotational stabilization means such that, during use, the left and right contacts orient such that the first direction is orthogonal to the second direction.

2. The contact lens set of claim 1, wherein the first and second plurality of parallel metal lines comprise metal wires.

3. The contact lens set of claim 1, wherein the first and second plurality of parallel metal lines are produced on the lens substrate by lithography.

4. The contact lens set of claim 1, wherein the lens substrate comprises a biocompatible polymer.

5. The contact lens set of claim 1, wherein the lens substrate comprises a biocompatible polymer selected from poly(2-hydroxyethyl methacrylate), poly(glycerol methacrylate), poly(methyl methacrylate), polyethylene oxide, polyvinyl alcohol, polydioxaline, poly(acrylic acid), poly(acrylamide), poly(N-vinyl pyrrolidone).

6. The contact lens set of claim 1, wherein the lens substrate comprises poly(methyl methacrylate).

7. The contact lens set of claim 1, wherein the rotational stabilization means comprises the lens substrate for each of the left and right contact lens having a center of gravity displaced toward an edge of each contact lens that is selected to be disposed downwardly.

8. The contact lens set of claim 7, wherein the center of gravity is displaced by thinning one side of each contact lens with respect to the other side.

9. The contact lens set of claim 7, wherein the center of gravity is displaced by forming the lens substrate with a thicker portion on one side of each contact lens.

10. The contact lens set of claim 7, further comprising an identifiable marking on a surface of each contact lens indicating the intended orientation of the lens.

11. The contact lens set of claim 1, further comprising a capping polymer layer on each contact lens, wherein the capping polymer layer overlies the plurality of parallel metal lines on each contact lens.

12. The contact lens set of claim 11, wherein the capping polymer layer comprises a polyxylene polymer.

13. A contact lens for stereoscopic visualization comprising a lens substrate, a polarizer, and a capping layer overlying the polarizer, wherein the polarizer comprises a plurality of parallel metal lines having sub-wavelength pitch and oriented in a first direction on the lens substrate, and wherein the contact lens is preferentially weighted on one side such that, during use, the contact lens will orient in a desired direction.

* * * * *